| United States Patent [19] | [11] Patent Number: 4,902,560 |
|---|---|
| Silver | [45] Date of Patent: Feb. 20, 1990 |

[54] IMPROVING THE PHYSICAL PROPERTIES OF GLASS COMPOSITE POLYDICYCLOPENTADIENE BY HEAT TREATMENT

[75] Inventor: Paul A. Silver, Wilmington, Del.

[73] Assignee: Hercules Incorporated, Wilmington, Del.

[21] Appl. No.: 200,889

[22] Filed: Jun. 1, 1988

[51] Int. Cl.[4] .................. B27C 45/02; B29C 45/14; B32B 17/10; B32B 27/32
[52] U.S. Cl. .................................... 428/273; 264/236; 264/257; 264/324; 264/328.8; 264/328.14; 264/328.19; 264/331.13; 264/347; 428/175; 428/441
[58] Field of Search ............ 264/236, 257, 324, 328.8, 264/328.14, 328.19, 331.13, 347; 428/273, 441

[56] References Cited

U.S. PATENT DOCUMENTS 4,400,340  8/1983  Klosiewicz ...................... 264/328.6
4,708,969  11/1987  Leach .................................. 521/82

*Primary Examiner*—James C. Cannon
*Attorney, Agent, or Firm*—Mark D. Kuller; William S. Alexander

[57] ABSTRACT

A method of preparing a glass fiber-reinforced, crosslinked polymer structure which comprises saturating an uncoated, unsized woven glass fabric with a polymerizable liquid comprised of dicyclopentadiene and, optionally, one or more other metathesis polymerizable strained ring polycyclic cycloolefins, subjecting said saturated fabric to polymerization conditions, and, thereafter, post-curing the resultant structure at a temperature greater than about 225° C., and a glass fiber-reinforced, crosslinked polymer prepared by that process, are disclosed. Post-curing at temperatures greater than 225° C. enhances the physical properties of the woven fiber-reinforced, crosslinked polymer.

20 Claims, No Drawings

IMPROVING THE PHYSICAL PROPERTIES OF GLASS COMPOSITE POLYDICYCLOPENTADIENE BY HEAT TREATMENT

This invention relates to a process for preparing glass fiber-reinforced, crosslinked polymers comprised of dicyclopentadiene, and to the resultant composite materials.

BACKGROUND OF THE INVENTION

Crosslinked or thermoset polymers of strained ring polycyclic cycloolefins are relatively new materials which show great commercial promise as structural or engineering plastics. Preparation of these polymers, usually based on dicyclopentadiene, is taught, e.g., by Klosiewicz in U.S. Pat. No. 4,400,340. Klosiewicz teaches a reaction injection molding (RIM) technique wherein a first monomer stream containing a catalyst and a second monomer stream containing a catalyst activator are brought together in a mix head and substantially immediately injected into a mold where the monomer polymerizes within seconds to form a shaped article matching the shape of the mold.

In the presence of both the catalyst and the catalyst activator, polymerization is almost instantaneous. Klosiewicz teaches that a reaction rate moderator is included in the activator stream to delay the onset of polymerization for the few seconds required to transfer the reaction mass from the mix head to the mold. Other investigators have found activators that delay polymerization for as long as several minutes or, at room temperature, up to an hour or more. These activators permit the use of these reaction streams in techniques where mold filling is necessarily slow, such as in rotational molding, resin transfer molding, and RIM processes where very large structures are to be molded.

Neat polymers based on dicyclopentadiene or other strained ring polycyclic cycloolefins provide an excellent balance of stiffness and impact properties. For many applications, however, particularly for high performance structural applications such as automobile seat supports and body frames, even higher stiffness and strength are desired. For these applications, fiber reinforcement of the structure is desirable, and it has been taught, e.g., by Leach in U.S. Pat. No. 4,708,969 to form glass, graphite, or aramid fiber-reinforced structures based on cyclic olefins.

Fiber reinforced polymer structures, per se, are well known in the structural polymer art. Such materials, frequently referred to as composite materials or, more simply, composites, are widely employed, e.g., in aerospace applications and in the automobile industry.

SUMMARY OF THE INVENTION

According to this invention, it has been found that the physical properties (e.g., improved flexural modulus, flexural strength, tensile modulus and tensile strength, and minimal heat distortion, while still having excellent impact strength) of a glass-reinforced polymer comprised of one or more strained ring polycyclic cycloolefins can be significantly improved by using an uncoated, unsized, woven glass fabric and post-curing said glass fiber-reinforced polymer following the polymerization steps. More precisely stated, the invention is a method of preparing a glass fiber-reinforced, crosslinked polymer structure which comprises saturating an uncoated, unsized woven glass fabric with a polymerizable liquid comprised of dicyclopentadiene and, optionally, one or more other metathesis polymerizable strained ring polycyclic cycloolefins, subjecting said saturated fabric to polymerization conditions, and, thereafter, post-curing the resultant structure at a temperature greater than about 225° C., preferably between 225° C. and 350° C., for a time greater than one-half hour, preferably between one and two hours. This invention is also directed to a glass fiber-reinforced, crosslinked polymer structure prepared by this process.

DETAILED DESCRIPTION OF THE INVENTION

Post-cured, fiber-reinforced polymers prepared according to this invention generally contains between about 30 and about 70% uncoated, unsized, woven glass-fibers, by weight of the reinforced polymer (i.e., polymer, glass reinforcement, etc.).

The monomers which react to form the reinforced matrix of this invention are described as being metathesis polymerizable. By this is meant that polymerization is effected by opening of a cycloolefin ring. Metathesis polymerization is, per se, well known as described by Klosiewicz. The reaction is catalyzed by a transition metal catalyst such as a tungsten or molybdenum salt, preferably tungsten halide or tungsten oxyhalide, activated by an alkyl aluminum compound. The reaction, unless steps are taken to delay it, takes place almost instantaneously upon combining a monomer/activator mixture with a monomer/catalyst mixture.

Onset of polymerization is characterized by a very rapid gelation, i.e., increase in the viscosity of the reaction mixture. The time between mixing the liquids and onset of polymerization is referred to as the induction time. In preparation of glass reinforced structures, it is critical that the reaction mixture saturate the woven glass fabric during the induction time. If it does not, complete saturation of the mat may not occur, since gels cannot penetrate into the fabric. It is also possible if viscosity increase starts prior to saturation of the mat, that the mat may be pushed around in the mold cavity so that it will not be uniformly distributed in the final reinforced structure or it will not remain in areas where it is desired to effect selective reinforcement of the structure. The techniques alluded to hereinabove for delaying the onset of gelation (i.e., extending the induction time) permit the preparation of glass-reinforced structures by any of the conventional liquid molding techniques such as reaction injection molding, centrifugal (rotational) molding and resin transfer molding. Delaying the gelation also assists in manufacturing large reinforced structures.

Reaction injection molding is a preferred method of forming composite structures per this invention. According to this process, a polymerizable liquid is formed from two or more separate streams, one stream of which contains the activator of a metathesis-catalyst system and reaction rate moderator and a second stream of which contains the catalyst. The monomer may be in either, or both, of these two streams, or in a separate stream. Preferably, the monomer is contained in equal amounts in the catalyst and activators streams.

The reaction may also be carried out using a premixed polymerizable liquid comprising the activator, catalyst, dicyclopentadiene, etc., provided that the liquid is designed so that the induction time is sufficient for proper saturation of the woven glass fabric prior to polymerization.

In order to provide a suitable induction time, a dialkyl aluminum iodide can be employed alone or in combination with another alkyl aluminum compound as the catalyst activator as taught, e.g., in U.S. Pat. Nos. 4,598,102; 4,469,669; 4,458,037 and 4,708,969. Useful dialkyl aluminum iodides are those having 1 to 12 carbon atoms in the alkyl groups, preferred species being diethyl aluminum iodide and dioctyl aluminum iodide. When used in conjunction with another alkyl aluminum compound, the other compound can be either a trialkyl aluminum or a dialkyl aluminum chloride having alkyl groups of 1 to 12 carbon atoms. Preferred are compounds wherein the alkyl groups have 2 or 8 carbons.

Reaction rate moderators include Lewis bases and chelants such as esters, ethers, acetylacetones, dibenzoyl methane and alkyl acetylacetates, where the alkyl group contains from 1 to 10 carbon atoms, and, in particular, n-butyl ether and diglyme (ethylene glycol dimethyl ether). For longer induction times, Nelson, in U.S. Pat. No. 4,727,125, teaches the use of sterically unhindered or partially unhindered nucleophilic Lewis bases including unsaturated cyclic amines such as, e.g., pyridine, 2-,3-,4-, or 3,4-di-substituted pyridines, 2-,2,3-di-, or 2,5-di-substituted pyrazines, quinoline and quinoxaline and cyclic saturated polycyclic amines such as hexamethylene tetramine and 1,4-diazabicyclo[2.2.2]octane, as well as phenanthridine, pyrimidine, isoquinoline and substituted derivatives of these materials, and, in U.S. patent application No. 07/053,429 (filed May 18, 1987), commonly assigned herewith, the use of 1,3-bidentate Lewis bases.

The preferred monomer for preparing glass fiber-reinforced structures according to this invention is dicyclopentadiene. Optionally, the polymerizable liquid can contain up to about 60% by weight of one or more other strained ring polycyclic cycloolefin comonomers. Exemplary strained ring polycyclic cycloolefins which can be employed as the comonomer include norbornene, norbornadiene, vinyl norbornene, ethylidene norbornene, phenylnorbornene, tetracyclododecene, methyltetracyclododecene, tetracyclododecadiene and methyltetracyclododecadiene and higher oligomers of cyclopentadiene such as tricyclopentadiene and tetracyclopentadiene.

The glass fabric to be used in this invention must be a woven fabric. That is to say, it must have a readily identifiable, uniformly biaxially positioned warp and weft.

The glass fabric must also be substantially completely free of surface coatings. Any processing materials or functional materials applied to the surface of the glass must be substantially completely removed in order for the method of this invention to be effective. In fact, physical properties of structures prepared with glass containing surface treatments such as, e.g., sizing or coupling agents, deteriorate upon post-cure according to this invention. Most such treatment materials can be removed by appropriate solvent treatment or by heat treatment at temperatures above about 450° C.

The following examples are illustrative and not intended to be limiting. Therein, all percentages, parts, etc. are by weight of the total composite material produced unless otherwise indicated.

EXAMPLE 1 (CONTROL)

This is a control example showing preparation and testing of a glass fiber-reinforced poly(dicyclopentadiene) polymer, which was not post-cured.

Biaxial woven glass cloth (0°/90° biaxially woven 1 ounce/foot$^2$ cloth) was heat cleaned to remove processing chemicals and then an amount such that the glass fibers will comprise 60 weight percent of the final product was encased in a mold comprising a fluorocarbon polymer gasket sandwiched between two pieces of polished sheet metal (This assembly was sandwiched between two aluminum plates to provide rigidity and clamped together).

A 0.43M aluminum alkyl activator solution was prepared by:

(a) injecting 10 parts by volume of di-n-octyl aluminum iodide (DOAI) into a reactor previously sparged with dry nitrogen;

(b) drying the toluene with silica gel and molecular sieves;

(c) diluting the DOAI with 40 parts by volume dried toluene; and (d) injecting 8.5 parts by volume butyl ether (BE) into the solution.

The resulting activator system has a DOAI/BE mole ratio of ½.

A polymerizable solution is prepared by injecting 75 parts by volume dicyclopentadiene into a sealed reactor, previously sparged with dry nitrogen. Then, 3.9 parts by volume of the 0.43M aluminum alkyl activator solution was added to the reactor and the solution was mixed. Then, 1.1 parts by volume catalyst solution (0.5M WCl$_6$ in toluene) was added to the reactor and the solution was mixed. Afterwards, the polymerizable solution was injected into the bottom of a metal mold containing the glass fabric. When the mold was filled, the injection port was sealed and the mold was cured for 45 minutes at 90° C.

EXAMPLE 2 (INVENTION)

This example shows preparation and testing of a glass fiber-reinforced crosslinked polymer per this invention containing 60 weight percent biaxially woven glass reinforcement.

A poly(dicyclopentadiene) sample prepared in the same manner as the sample of Example 1 was post-cured by laying the plaque flat in an oven and heating to 300° C. for 1 hour.

The results of Examples 1 and 2 are shown in Table 1, below.

TABLE 1

| | 60 Weight % Clean, Woven Glass | | | | | |
|---|---|---|---|---|---|---|
| Example | Flex Mod. (KPSI[1]) | Flex Strength (KPSI) | Tensile Mod. (KPSI) | Tensile Strength (ft./lbs./in.) | Notched Izod (ft.lbs./in.) | Comments |
| 1 (Control) | 1980 | 19.3 | 1185 | 22.4 | 15.6 | no post-cure |
| 2 (Invention) | 2145 | 37.4 | 1300 | 30.1 | 11.5 | post-cure |

TABLE 1-continued

| | | 60 Weight % Clean, Woven Glass | | | | |
|---|---|---|---|---|---|---|
| Example | Flex Mod. (KPSI[1]) | Flex Strength (KPSI) | Tensile Mod. (KPSI) | Tensile Strength (ft./lbs./in.) | Notched Izod (ft.lbs./in.) | Comments |
| | | | | | | at 300° C. |

[1]Thousands of pounds per square inch.

The data in Table 1 show that high temperature post-curing of the glass composites of this invention leads to enhanced physical properties. Here, using 60 weight % clean, untreated woven glass, an increase in both flex strength (94%) and tensile strength (35%) occurs, although a minor loss in notched Izod impact strength is experienced.

EXAMPLE 3 (COMPARISON)

This is a comparison example showing that the effects of post curing the composite demonstrated above are not obtained when the glass is coated with a coupling agent.

This example was carried out in the same manner as Example 2 except that the glass was heat cleaned and coated with a coupling agent.

The results of Example 3 along with the results from control Example 1, are shown in Table 2, below.

TABLE 2

| | Comparison of Composites Prepared With Glass Coated with Coupler | | | | | |
|---|---|---|---|---|---|---|
| Example | Flex Mod. (KPSI)[1] | Flex Strength (KPSI) | Tensile Mod. (KPSI) | Tensile Strength (ft./lbs./in.) | Notched Izod (ft.lbs./in.) | Comments |
| 1 (Control) | 1980 | 19.3 | 1185 | 22.4 | 15.6 | no post-cure; heat cleared glass |
| 3 (Comparison) | 1430 | 15.4 | 1250 | 24.3 | 8.6 | post-cure at 300° C.; glass coated with coupling agent |

Table 2 shows that as-molded properties of a composite material deteriorate upon post-curing the composite when a coupling agent is present. Voids were formed in the composite during post cure.

EXAMPLE 4 (CONTROL)

This is a control example showing the properties of a composite prepared with 17 weight percent glass.

This example was carried out in the same manner as Example 1, except that the glass was used in an amount such that the final composite product contained 17 weight percent clean, woven glass.

EXAMPLE 5 (COMPARISON)

This is a comparative example showing the effect of post-curing a composite prepared with 17 weight percent glass.

This example was carried out in the same manner as Example 2, except that the glass was used in an amount such that the final composite product contained 17 weight percent glass. The final product delaminated and it was not possible to measure its properties.

EXAMPLE 6 (INVENTION)

This example shows preparation and testing of a glass fiber-reinforced crosslinked polymer per this invention containing 30 weight percent biaxially woven glass reinforcement.

This example was carried out in the same manner as example 2, except that the glass was used in an amount such that the final composite product contained 30 weight percent glass.

EXAMPLE 7 (INVENTION)

This example shows preparation and testing of a glass fiber-reinforced crosslinked polymer per this invention containing 42 weight percent biaxially woven glass reinforcement.

This example was carried out in the same manner as example 2, except that the glass was used in an amount such that the final composite product contained 42 weight percent glass.

Results for Examples 4, 6 and 7, as well as control Example 1, are shown in Table 3 below.

TABLE 3

| | Various Amounts of Woven Glass | | | | | |
|---|---|---|---|---|---|---|
| Example | Glass Fibers (wt. %) | Flex Mod. (KPSI) | Flex Strength (KPSI) | Tensile Mod. (KPSI) | Tensile Strength (KPSI) | Comments |
| 1 (Control) | 60 | 1980 | 19.3 | 1185 | 22.4 | no post-cure |
| 4 (Control) | 17 | 475 | 14.7 | 620 | 11.4 | no post-cure |
| 6 (Invention) | 30 | 910 | 24.7 | 1192 | 21.5 | post-cure at 300° C. |
| 7 (Invention) | 42 | 1050 | 24.9 | 1763 | 29.2 | post-cure at 300° C. |

Examples 4 through 7 and Table 3 show that it is necessary to use greater than 17 weight percent glass. In addition, they show that composites prepared with 30 and 42 weight % glass have superior properties to a control having 60 weight percent glass, which result would not be expected due to their lower weight percentage of glass reinforcement.

EXAMPLE 8 (CONTROL)

This example shows preparation and testing of a glass fiber-reinforced crosslinked polymer containing cyclopentadiene trimer as a comonomer, reinforced with 60% clean, woven glass.

This Example was carried out in the same manner as Example 1 except that 26 weight % of the total monomers used were cyclopentadiene trimer.

EXAMPLE 9 (INVENTION)

This example shows the affect of post-cure on a glass fiber-reinforced crosslinked polymer containing cyclopentadiene trimer as a comonomer, and reinforced with 60% clean, woven, glass.

This Example was carried out in the same manner as Example 2 except that 26 weight % of the total monomers used were cyclopentadiene trimer.

EXAMPLE 10 (INVENTION)

This Example was carried out in the same manner as Example 9.

TABLE 4

| | Use of Comonomer | | | | |
|---|---|---|---|---|---|
| Example | Flex Mod. (KPSI) | Flex Strength (KPSI) | Tensile Mod. (KPSI) | Tensile Strength (KPSI) | Comments |
| 8 (Control) | 2185 | 25.8 | 1940 | 26.0 | no post-cure; 26 wt. % cyclopentadiene trimer comonomer |
| 9 (Invention) | 1000 | 13.0 | 2100 | 29.4 | post-cure at 300° C.; 26 wt. % cyclopentadiene trimer comonomer |
| 10 (Invention) | 430 | 9.1 | 2070 | 29.3 | post-cure at 300° C.; 26 wt. % cyclopentadiene trimer comonomer |

EXAMPLE 11 (CONTROL)

This is a control example showing preparation and testing of a glass fiber-reinforced poly(dicyclopentadiene) polymer, which was not post-cured. The glass fibers used in this example were random non-woven fibers which were not heat cleaned.

This example was carried out in the same manner as example 1 using 50 weight percent as-received (i.e., not heat cleaned) random non-woven glass fibers.

EXAMPLE 12 (COMPARISON)

This is a comparative example showing preparation and testing of a glass fiber-reinforced poly(dicyclopentadiene) polymer, which was post-cured. The glass fibers used in this example were not heat cleaned.

This example was carried out in the same manner as example 1, except that 50 weight percent as-received (i.e., not heat cleaned) random non-woven glass fibers.

EXAMPLE 13 (CONTROL)

This is a control example carried out in the same manner as Example 11 using 30 weight percent as-received, random non-woven glass fibers.

EXAMPLE 14 (COMPARISON)

This is a comparative example carried out in the same manner as Example 12 using 30 weight percent as-received, random non-woven glass fibers.

The results of Examples 11 through 14 are shown below in Table 5.

TABLE 5

| | Random, Non-Woven Glass (Not Heat-Cleaned) | | | | |
|---|---|---|---|---|---|
| Example | Flex Mod. (KPSI) | Flex Strength (KPSI) | Tensile Mod. (KPSI) | Tensile Strength (KPSI) | Comments |
| 11 (Control) | 1160 | 16.3 | 900 | 14.5 | no post-cure |
| 12 (Comparison) | 1040 | 17.0 | 945 | 13.8 | post-cure at 300° C. |
| 13 (Control) | 785 | 16.4 | 625 | 10.7 | no post-cure |
| 14 (Comparison) | 830 | 18.8 | 600 | 9.5 | post-cure at 300° C. |

Post-cure did not significantly affect the properties of composites prepared with non heat-cleaned, random non-woven fibers.

EXAMPLE 15 (CONTROL)

This is a control example showing preparation and testing of a glass fiber-reinforced poly(dicyclopentadiene) polymer, which was not post-cured. The glass fibers used in this example were random non-woven fibers which were heat cleaned.

This example was carried out in the same manner as Example 1 using 30 weight percent heat-cleaned random non-woven glass fibers.

EXAMPLE 16 (CONTROL)

This is a second control, carried out in the same manner as Example 15.

EXAMPLE 17 (COMPARISON)

This is a comparative example showing preparation and testing of a glass fiber-reinforced poly(dicyclopentadiene) polymer, which was post-cured. The glass fibers used in this example were random, non-woven, heat-cleaned fibers.

This example was carried out in the same manner as example 2 using 30 weight percent heat-cleaned, random non-woven glass fibers.

EXAMPLE 18 (CONTROL)

This is a control example carried out in the same manner as Example 15 using 30 weight percent heat-cleaned, random non-woven glass fibers.

EXAMPLE 19 (CONTROL)

This example was carried out in the same manner as Example 18.

EXAMPLE 20 (COMPARISON)

This is a comparative example carried out in the same manner as Example 12 using 30 weight percent heat-cleaned, random non-woven glass fibers.

The results of Examples 15 through 20 are shown below in Table 6.

TABLE 6

| | Heat-Cleaned, Random Non-Woven Glass | | | | |
|---|---|---|---|---|---|
| Example | Flex Mod. (KPSI) | Flex Strength (KPSI) | Tensile Mod. (KPSI) | Tensile Strength (KPSI) | Comments |
| 15 (Control) | 1410 | 13.5 | 1050 | 7.2 | no post-cure |
| 16 (Control) | 1440 | 19.1 | 1380 | 9.2 | no post-cure |
| 17 (Comparison) | 945 | 12.3 | 1300 | 7.0 | post-cure at 300° C. |
| 18 (Control) | 940 | 17.8 | 660 | 8.2 | no post-cure |
| 19 (Control) | 820 | 12.8 | 750 | 6.6 | no post-cure |
| 20 (Comparative) | 740 | 9.2 | 900 | 5.2 | post-cure at 300° C. |

The data in Table 6 shows that post-cure does not significantly affect the properties of composites prepared with heat-cleaned, random non-woven fibers.

While this invention has been described with respect to specific embodiments, it should be understood that these embodiments are not intended to be limiting and that many variations and modifications are possible without departing from the scope of this invention.

What is claimed is:

1. A method of preparing a glass fiber-reinforced crosslinked, polymer comprising saturating an uncoated, unsized woven glass fabric with a polymerizable liquid comprised of dicyclopentadiene, subjecting said saturated fabric to polymerization conditions, and, thereafter, post-curing the resultant structure at a temperature greater than about 225° C.

2. A method as claimed in claim 1 wherein the woven glass fabric comprises 30 to 70%, by weight, of the glass fiber-reinforced, crosslinked polymer.

3. A method as claimed in claim 2 wherein the polymer is a homopolymer of metathesis polymerized units of dicyclopentadiene.

4. A method as claimed in claim 2 wherein post-cure is carried out by heating the resultant structure at a temperature greater than about 225° C. for a period of greater than about 30 minutes.

5. A method as claimed in claim 2 wherein said polymerizable liquid comprises up to about 60% by weight of one or more strained ring polycyclic comonomers other than dicyclopentadiene.

6. A method as claimed in claim 5 wherein said strained ring polycyclic comonomers are selected from the group consisting of norbornene, norbornadiene, vinyl norbornene, ethylidene norbornene, phenylnorbornene, tetracyclododecene, methyltetracyclododecane, tetracyclododecadiene, methyltetracyclododecadiene, tricyclopentadiene and tetracyclopentadiene.

7. A method as claimed in claim 2 wherein said polymerizable liquid comprises premixed:
   (a) metathesis polymerizable units of dicyclopentadiene,
   (b) activator of a metathesis-catalyst system comprising an dialkylaluminum iodide, and
   (c) catalyst of a metathesis-catalyst system.

8. The process of claim 7 wherein the polymerizable liquid further comprises a rate moderator.

9. The process of claim 8 wherein the catalyst is a tungsten compound.

10. The process of claim 9 wherein the activator is a dialkylaluminum iodide.

11. A method as claimed in claim 2 wherein said polymerizable liquid is formed from two or more separate streams, one stream of which comprises activator of a metathesis-catalyst system and a second stream of which comprises catalyst of a metathesis-catalyst system.

12. The process of claim 11 wherein the catalyst is a tungsten compound.

13. The process of claim 11 wherein the polymerizable liquid further comprises a rate moderator.

14. The process of claim 13 wherein the catalyst is a tungsten compound.

15. The process of claim 14 wherein the activator is a dialkylaluminum iodide.

16. A method as claimed in claim 12 wherein the polymer is a homopolymer of metathesis polymerized units of dicyclopentadiene.

17. A method as claimed in claim 4 wherein post-curing is carried out at the resultant structure at a temperature between 225° C. and 350° C.

18. A glass fiber-reinforced, crosslinked polymer of metathesis polymerized units of dicyclopentadiene and uncoated, unsized woven glass fabric, which has been post-cured at a temperature greater than 225° C.

19. A glass fiber-reinforced, crosslinked polymer as claimed in claim 18 wherein the woven glass fabric comprises 30 to 70%, by total weight of the glass fiber-reinforced, crosslinked polymer, and said polymer is a homopolymer of dicyclopentadiene.

20. A glass fiber-reinforced, crosslinked polymer as claimed in claim 8 wherein the woven glass fabric comprises 30 to 70%, by total weight of the glass fiber-reinforced, crosslinked polymer, and said polymer comprises up to about 60% by weight of one or more strained ring polycyclic comonomers selected from the group consisting of norbornene, norbornadiene, vinyl norbornene, ethylidene norbornene, phenylnorbornene, tetracyclododecene, methyltetracyclododecane, tetracyclododecadiene, methyltetracyclododecadiene, tricyclopentadiene and tetracyclopentadiene.

* * * * *

UNITED STATES PATENT AND TRADEMARK OFFICE
CERTIFICATE OF CORRECTION

PATENT NO. : 4,902,560

DATED : FEBRUARY 20, 1990

INVENTOR(S) : SILVER

It is certified that error appears in the above-identified patent and that said Letters Patent is hereby corrected as shown below:

Column 10, Line 58

"claim 8"   should read   --claim 18--.

Signed and Sealed this

Second Day of April, 1991

Attest:

HARRY F. MANBECK, JR.

Attesting Officer

Commissioner of Patents and Trademarks